United States Patent [19]
Pfleger

[11] Patent Number: 5,706,864
[45] Date of Patent: Jan. 13, 1998

[54] COOLANT CONDUITS

[75] Inventor: Wolfgang Pfleger, Tamins, Switzerland

[73] Assignee: EMS-Inventa AG, Switzerland

[21] Appl. No.: 382,852

[22] Filed: Feb. 3, 1995

[30] Foreign Application Priority Data

Feb. 9, 1994 [DE] Germany .................. 94 02 180 U

[51] Int. Cl.[6] ..................................... F16L 9/06
[52] U.S. Cl. .................. 138/121; 138/173; 138/137; 138/140; 138/141
[58] Field of Search ................... 138/137, 121, 138/122, 123–127, 140, 141, 177, 178, 173

[56] References Cited

U.S. PATENT DOCUMENTS

| 3,578,777 | 5/1971 | DeGain | 138/121 |
| 3,605,817 | 9/1971 | Bauman et al. | 138/121 |
| 3,802,202 | 4/1974 | Maroschak | 138/121 X |
| 4,510,974 | 4/1985 | Natori et al. | 138/137 |
| 4,592,231 | 6/1986 | Kant | 138/121 X |
| 4,880,036 | 11/1989 | Kitami et al. | 138/137 |
| 4,881,576 | 11/1989 | Kitami et al. | 138/137 X |
| 4,905,734 | 3/1990 | Ito | 138/137 |
| 4,950,103 | 8/1990 | Justice | 138/177 X |
| 5,076,329 | 12/1991 | Brunnhofer | 138/137 |
| 5,219,003 | 6/1993 | Kerschbaumer | 138/125 X |
| 5,341,849 | 8/1994 | Mang | 138/133 |

*Primary Examiner*—Patrick Brinson
*Attorney, Agent, or Firm*—Bierman, Muserlian & Lucas

[57] ABSTRACT

A highly flexible and hydrolysis and burst resistant, coolant conduit comprising a plurality of layers of different polymer compatible with one another at the contact surfaces of the layers, the conduit being at least partially corrugated and at least some of the individual adjacent corrugations being connected to each other by at least one crossbar or rib.

18 Claims, 2 Drawing Sheets

COOLANT CONDUITS

STATE OF THE ART

Coolant conduits made of polymers can be adapted to the high requirements of the motor vehicle industry by the prior art known from DE PS 37 15 251, 38 21 723, 40 25 300 and 42 14 383 by the selection and layer thickness of the polymer material used. Their material-dependent rigidity increases particularly with an increasing wall thickness. Therefore, conduits having a corrugated wall have already been proposed (DE PS 40 00 434, EP 00 10 751). However, these conduits, have the drawback that their corrugations can be enlarged not only under tension from the exterior but also under pressure from the interior. However, particularly with regard to coolant conduits, repeated variations in pressure which are generally also accompanied by pronounced variations in temperature lead to fatigue in the material owing to the resultant alternating stresses leading to premature failure of the conduits.

OBJECTS OF THE INVENTION

It is an object of the invention to provide coolant conduits having as little change in length as possible after heating and being subjected to stress to meet the narrow tolerances required by the auto industry.

It is another object of the invention to provide highly flexible conduits with high hydrolysis and burst pressure resistance.

These and other objects and advantages of the invention will become obvious from the following detailed description.

THE INVENTION

The novel coolant conduits of the invention having high flexibility and hydrolysis and pressure bursting resistance are comprised of a plurality of layers of different polymers compatible with one another at the contact surfaces of the layers, the conduit being at least partially corrugated and at least some of the individual adjacent corrugations being connected to each other by at least one crossbar or rib. Preferably, the conduit has at least one internal layer and a polyamide external layer.

The conduit may be made by co-extrusion of a multi-layered tube of the polymers and subsequent formation of the corrugations and the groove-shaped ribs by blow molding or suction molding.

In a preferred embodiment of the invention, the at least partially corrugated conduit has at least one groove-like rib between pairs of adjacent corrugations. Preferably, the said ribs are continuously offset at a defined angle, preferably at 90°, 120° or 180°.

The coolant conduits are preferably made of polymer layers having different functions such as an internal layer inert to the conveyed medium and one external layer resistant to pressure and mechanical influences or stress. Conduits with two layers of mutually compatible polymers are preferred. Embodiments with internal layers and external layers of polymers which are insufficiently compatible with one another advantageously contain an intermediate layer of polymers which are compatible with those of the internal layer and external layer. Homopolyolefins and copolyolefins containing functional groups or blends of the various polymers of the layers to be connected are advantageously suitable for this purpose.

The burst-resistant external layer preferably consists of polyamides selected from the group consisting of homopolyamides, copolyamides, their blends or mixtures with one another or with other polymers, polyamides of linear aliphatic monomers of 6 to 12 carbon atoms, aromatic monomers of 6 to 12 carbon atoms and/or cycloaliphatic monomers of 6 to 20 carbon atoms being preferred. PA 6, PA 66 and PA 12 are especially preferred.

The internal layer preferably consists of polyolefins. Halogenated and non-halogenated homopolyolefins and copolyolefins, their mixtures and their blends are particularly preferred, more preferably are those containing functional groups which produce the compatibility with the external layer. If this compatibility does not exist, the above-mentioned intermediate layer is required.

Preferred halogenated polymers include fluorinated homopolyolefins or copolyolefins such as PVDF or ETFE. Compatible or compatibilizing polymers include grafted polyolefins and those which have received their functional groups from suitable copolymers, for example acrylic acid derivatives and homologues thereof.

In conventional embodiments of the invention, the wall thickness of the external layer of the coolant conduit comprises 25 to 95% of the total wall thickness of the conduit. Layer thicknesses of 0.1 to 0.2 mm are generally sufficient for the intermediate layer which, in particular embodiments, can have barrier effects in addition to adhesive effects.

A particularly advantageous embodiment of the coolant conduit of the invention consists of an internal layer in which the polymer is essentially a copolyolefin grafted with an α-unsaturated dicarboxylic acid and of which the external layer is essentially polyamide 12. A further preferred embodiment consists of a polyvinylidene fluoride internal layer and a PA 12 external layer. The intermediate layer required in this case is advantageously a blend of essentially PA 12 and PVDF. Another preferred embodiment has an internal layer of a blend comprising a homopolyolefin, for example polypropylene, with a EPDM, which is preferably cross linked, an intermediate layer of a functionalized homopolyolefin or copolyolefin and an external layer of PA 12.

The polymers of the individual layers can be modified according to the prior art by additives to assist processing or application. Stabilizers, plasticizers, pigments and additives to improve impact resistance or conductivity are mentioned particularly.

The coolant conduits of the invention can be produced by coextrusion of the polymer layers to form tubes with subsequent formation of corrugations and ribs by suction molding or blow molding.

The coolant conduits of the invention have a bursting resistance which is about 1 to 20% higher than that of similar conduits without ribs and their flexibility is virtually unrestricted. Thus, for example, ribs which are continuously offset by 90° allow the same flexibility of the conduit to form very close windings. At the same time, undesirable elongation of the conduits of the invention can be largely avoided. Furthermore, advantageous savings of material are possible for defined bursting pressure limits.

REFERRING NOW TO THE DRAWINGS

Figure 1:
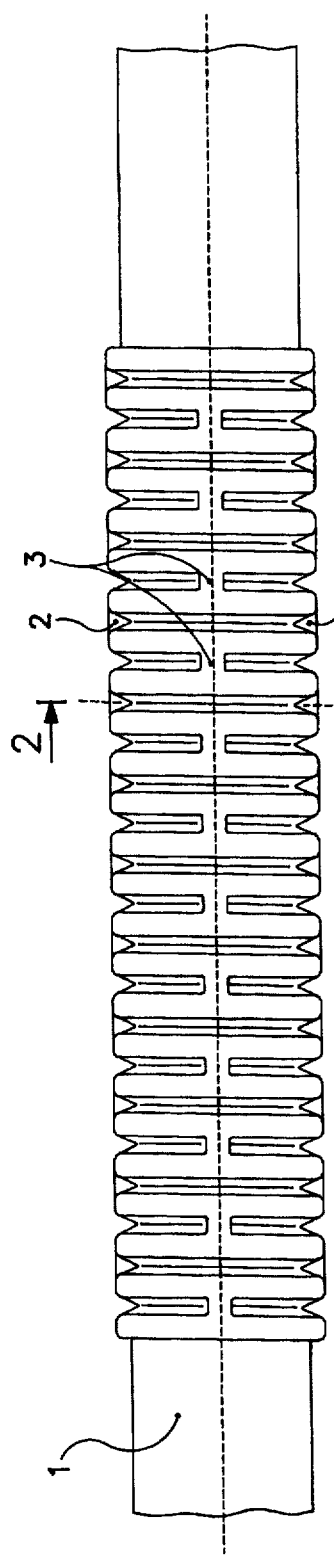
FIG. 1 is a partial plan view of a three-layered coolant conduit having two respective ribs offset by 90° on the outer contour of the corrugations.
Figure 2:
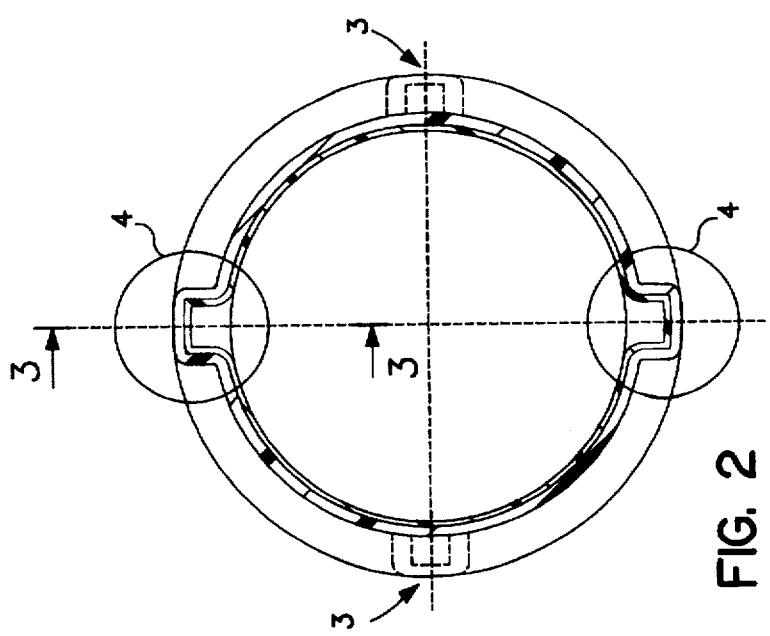
FIG. 2 is a cross-section of the coolant conduit of FIG. 1 taken along line A—A and FIG. 3 is a cross-section of the coolant conduit of FIG. 1 taken along line B–B'.
Figure 3:
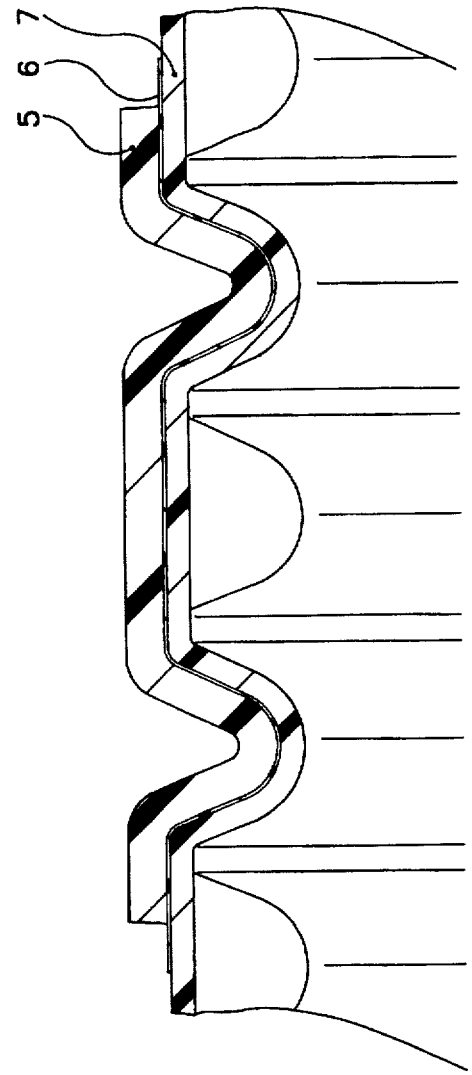
Figure 4:
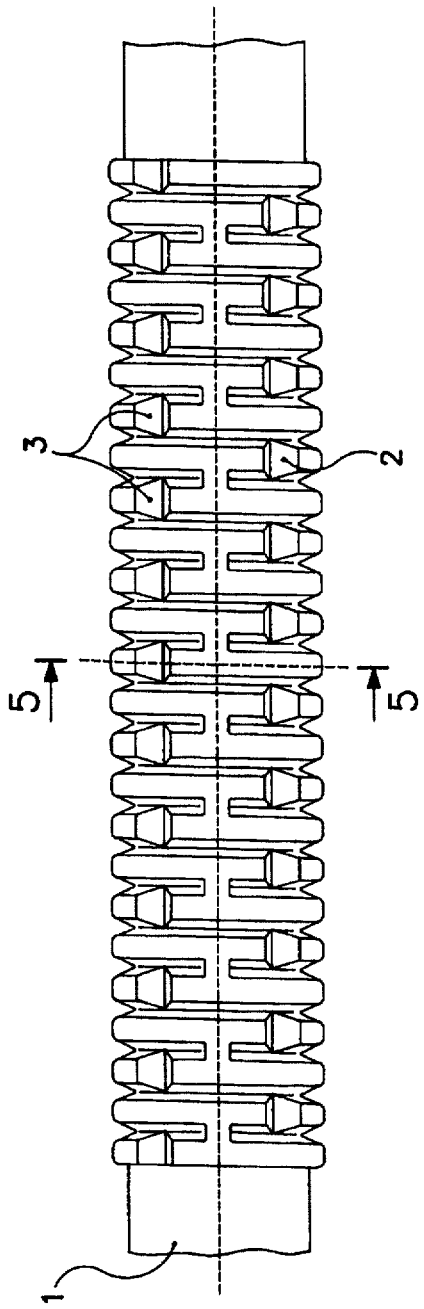
FIG. 4 is a partial plan view of a second embodiment of a three-layered coolant conduit having two ribs continuously offset by 90° on the inner contour of the corrugations.
Figure 6:
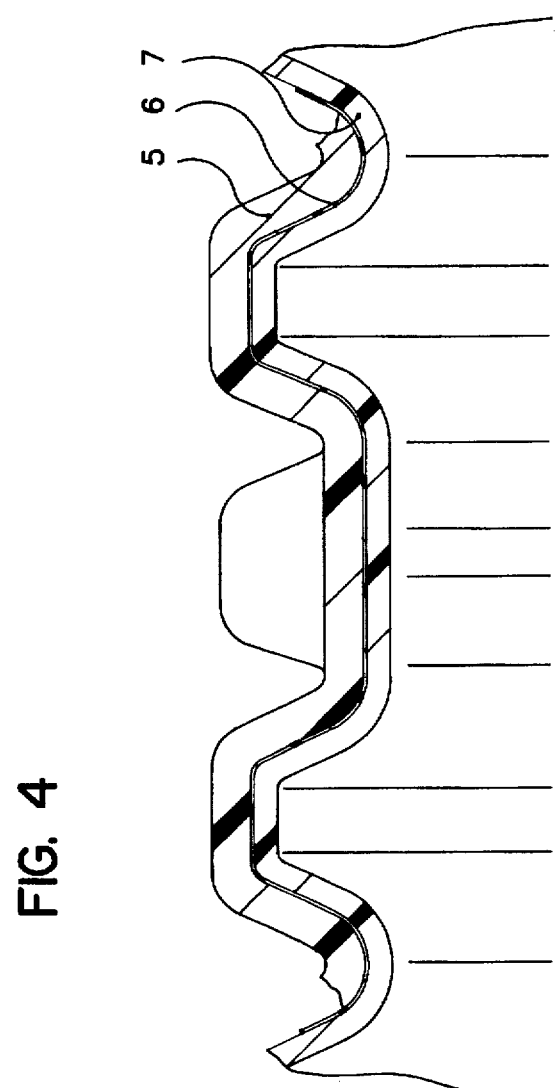
FIG. 5 is a cross-section of the coolant conduit of FIG. 4 taken along line A—A and FIG. 6 is a cross-section of the coolant conduit of FIG. 4 taken along line B—B.
Figure 5:
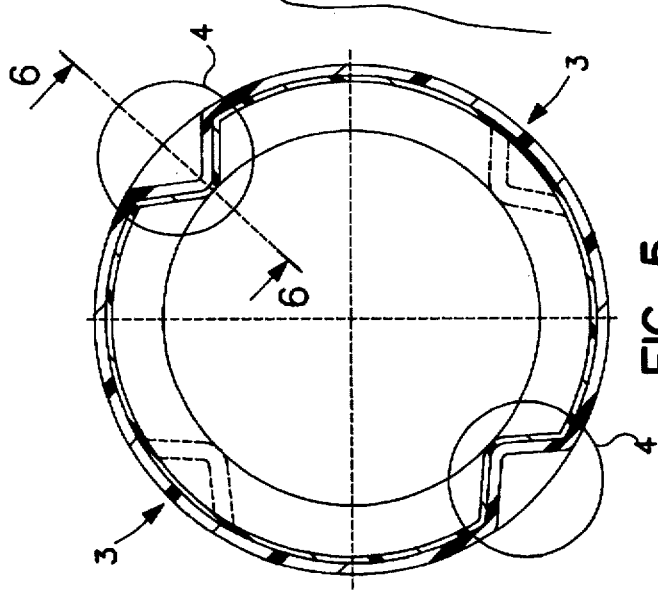

In FIG. 1, the corrugated three-layered conduit is provided with ribs or crossbars (2), each externally connecting two adjacent corrugations with ribs (3) offset by 90° from ribs (2) on the conduit periphery of the tube. The cross-section A—A of FIG. 2 shows the bead-like shape of the ribs (4). The section B—B of FIG. 3 shows the-longitudinal section of cooling conduit (1) and external layer (5) and middle layer (6) and internal layer (7). FIGS. 4 to 6 show similar views of the second embodiment with ribs on their inner contour of the corrugations.

Various modifications of the coolant conduit of the invention may be made without departing from the spirit or scope thereof and it is to be understood that the invention is intended to be limited only as defined in the appended claims.

What I claim is:

1. A highly flexible and hydrolysis and burst resistant, coolant conduit comprising a plurality of layers of different polymers compatible with one another at the contact surfaces of the layers, the conduit being at least partially, including a plurality of ribs for connecting pairs of adjacent corrugations, wherein each corrugation is connected to a successive corrugation by at least one rib positioned in a first plane, said successive corrugation being connected to a next successive corrugation by at least one rib positioned in a second plane, said second plane being angularly offset from said first plane by a defined angle, wherein said ribs in the first plane and ribs in the second plane alternate in the longitudinal direction of the conduit between said pairs of corrugations, whereby said ribs between one adjacent pair of corrugations are angularly offset from said ribs between a next adjacent pair of corrugations, the external layer being made of a polymer selected from the group consisting of homopolyamides, copolyamides, blends thereof and mixtures thereof with one another and with other polymers.

2. A coolant conduit of claim 1 consisting of two layers of compatible polymers.

3. A coolant conduit of claim 1 comprising at least one internal layer, at least one intermediate layer and at least one external layer, the at least one intermediate layer capable of functioning as a barrier layer.

4. A coolant conduit of claim 1 having pairs of adjacent corrugations continuously connected by at least one rib.

5. A coolant conduit of claim 1 wherein at least one rib comprises a groove-like deformation of the conduit wall.

6. A coolant conduit of claim 1 having at least one internal layer inert to the coolant conveyed and an external layer resistant to pressure and mechanical influences.

7. A coolant conduit of claim 1 wherein the external layer is made of a member of the group consisting of homopolyamides, copolyamides of linear aliphatic monomers of 6 to 12 carbon atoms and cycloaliphatic monomers of 6 to 20 carbon atoms.

8. A coolant conduit of claim 1 wherein the external layer is made of a polymer selected from the group consisting of PA 6, PA 12 and PA 66 optionally modified by a member of the group consisting of processing additives and application additives.

9. A coolant conduit of claim 6 wherein the internal layer is made of a polymer selected from the group consisting of halogenated and non-halogenated homopolyolefins and copolyolefins and mixtures and blends thereof containing functional groups making it compatible with the external layer.

10. A coolant conduit of claim 3 wherein the internal layer is made of a polymer selected from the group consisting of halogenated and non-halogenated homopolyolefins and copolyolefins insufficiently compatible with the external layer and the intermediate layer is compatible with the internal layer and the external layer.

11. A coolant conduit of claim 10 wherein the intermediate is made of a polymer selected from the group consisting of a grafted polyolefin, a grafted copolyolefin, copolyolefin provided with functional groups by copolymerization, their blends with non-functionalized polymers, and blends of the said polymers connected to one another and optionally additional polymers.

12. A coolant conduit of claim 9 wherein the internal layer is made of a copolyolefin with grafted α-saturated dicarboxylic acids and optionally also containing non-grafted polyolefin and the external layer is made of a member of the group consisting of modified and non-modified PA 12.

13. A coolant conduit of claim 11 wherein the internal layer is made of PVDF, the external layer is made of a member of the group consisting of modified PA 6, and PA 12 and the intermediate layer is made of a blend of the polymers of the internal and external layers.

14. A coolant conduit of claim 10 wherein the internal layer is made of a blend of a member of the group consisting of a polyolefin and copolyolefin with EPDM, the intermediate layer is made of a member of the group consisting of a functionalized polyolefin and copolyolefin and the external layer is made of a member of the group consisting of modified and non-modified PA 12.

15. A coolant conduit of claim 1 wherein the wall thickness of the pressure burst resistant external layer is 25 to 95% of the total wall thickness.

16. A coolant conduit of claim 3 wherein the thickness of the intermediate layer is 0.1 to 0.2 mm.

17. A coolant conduit of claim 1 produced by co-extrusion of a multi-layered tube of the polymers and subsequent formation of the corrugation and groove shaped ribs by blow molding.

18. A coolant conduit of claim 1 produced by co-extrusion of a multi-layered tube of the polymers and subsequent formation of the corrugation and groove shaped ribs by suction molding.

* * * * *